(12) United States Patent
Ito et al.

(10) Patent No.: US 6,641,768 B2
(45) Date of Patent: Nov. 4, 2003

(54) METHOD FOR MANUFACTURING AN AIR PASSAGE SWITCHING DOOR

(75) Inventors: Masahiro Ito, Takahama (JP); Kosei Banno, Kariya (JP)

(73) Assignees: Denso Corporation, Kariya (JP); Shimizu Industry Co., Ltd., Kariya (JP)

(*) Notice: Subject to any disclaimer, the term of this patent is extended or adjusted under 35 U.S.C. 154(b) by 238 days.

(21) Appl. No.: 09/761,126

(22) Filed: Jan. 16, 2001

(65) Prior Publication Data

US 2001/0008321 A1 Jul. 19, 2001

(30) Foreign Application Priority Data

Jan. 18, 2000 (JP) ........................................ 2000-013934

(51) Int. Cl.⁷ ........................... B29C 45/14; B29C 31/04
(52) U.S. Cl. ....................... 264/242; 264/250; 264/255; 264/271.1
(58) Field of Search ................................. 264/250, 251, 264/252, 255, 259, 271.1, 275, 242, 264, 328.8; 425/120, 129.1, 130

(56) References Cited

U.S. PATENT DOCUMENTS

| 4,445,159 A | | 4/1984 | Nemoto et al. | |
| 5,129,807 A | * | 7/1992 | Oriez et al. | 425/174 |
| 5,304,336 A | * | 4/1994 | Karlsson et al. | 264/242 |
| 5,362,428 A | * | 11/1994 | Tsujino et al. | 264/40.5 |
| 5,658,509 A | * | 8/1997 | Sawyer et al. | 264/46.4 |
| 5,695,699 A | * | 12/1997 | Naritomi | 264/46.4 |
| 6,024,551 A | | 2/2000 | Yamaguchi | |
| 6,120,274 A | * | 9/2000 | Gerig et al. | 425/116 |
| 6,146,565 A | * | 11/2000 | Keller | 264/46.5 |
| 6,228,305 B1 | * | 5/2001 | Okuda et al. | 264/252 |

FOREIGN PATENT DOCUMENTS

| DE | 195 21 169 | 12/1996 |
| DE | 198 48 440 | 4/2000 |
| JP | 2-147217 | 6/1990 |
| JP | A-6-254895 | 9/1994 |

* cited by examiner

*Primary Examiner*—Angela Ortiz
(74) *Attorney, Agent, or Firm*—Harness, Dickey & Pierce, PLC

(57) ABSTRACT

In a method for manufacturing an air passage switching door with a seal member extending along an outer peripheral portion of a door body, when a melted elastic material for forming the seal member is injected into a mold space from plural injection gates, a flow length of the melted elastic material is set to be equal or smaller than 40 mm. Accordingly, even when the method is used for forming the air passage switching door where a length of one side seal member extending along the outer peripheral portion at one side of a rotation shaft is equal to or larger than 100 mm and a thickness of the seal member is equal to or smaller than 2.0 mm, a deformation of the seal member due to an inner shrinking force can be sufficiently restricted.

15 Claims, 12 Drawing Sheets

METHOD FOR MANUFACTURING AN AIR PASSAGE SWITCHING DOOR

CROSS-REFERENCE TO RELATED APPLICATION

This application relates to and claims priority from Japanese Patent Application No. 2000-13934 filed on Jan. 18, 2000, the contents of which are hereby incorporated by reference.

BACKGROUND OF THE INVENTION

1. Field of the Invention

The present invention relates to an air passage switching door for opening and closing an air passage through which air flows. More particularly, the present invention relates to a method for manufacturing the air passage switching door for a vehicle air conditioner.

2. Related Art

A conventional air passage switching system for a vehicle air conditioner has an air conditioning case for forming an air passage, and a butterfly door for switching the air passage. A rotation shaft for rotating the butterfly door is disposed at side end centers of the door. The butterfly door is rotatably held in the air conditioning case to be rotated by the rotation shaft. The butterfly door includes a door body portion made of resin having a high rigidity, and a lip-seal like seal member made of an elastomer.

When the door is manufactured, after the door body portion is inserted into a forming die, a melted elastic material is injected to a peripheral portion of the door body portion so that the seal member is formed integrally with the door body portion by an injection molding. Therefore, a shearing force is generated in an inner side of the elastic material due to the injection pressure during the injection molding of the seal member, and remains in the seal member as a shrinking force (inner stress).

Further, when the seal member (elastomer) is placed in a high-temperature condition after being injection-molded, the elastomer is heat-shrunken from this elastomer material characteristics. Accordingly, the seal member is readily deformed due to the inner shrinking force, and is readily bent upwardly at a corner portion.

SUMMARY OF THE INVENTION

In view of the foregoing problems, it is an object of the present invention to provide a method for manufacturing an air passage switching door where a thin and flat seal member made of an elastic material is attached to an outer peripheral portion of a door body. The manufacturing method can restricts a deformation of the seal member due to an inner shrinking force.

According to the present invention of the present invention, in a method for manufacturing an air passage switching door with a seal member continuously extending from an outer peripheral portion of a door body toward an outer side to have a thin plate-like shape, a melted elastic material is injected from plural injection gates provided at plural positions into a mold space within a forming die for forming the seal member of the door, and a flow length of the melted elastic material from each injection gate is equal to or smaller than 40 mm. Therefore, a flow resistance of the melted elastic material injected from the plural injection gates into the mold space can be made smaller, and a flow performance of the melted elastic material can be increased at a flow top end side. Thus, a cooling speed difference (i.e., temperature difference) or a pressure difference between each injection gate and the flow top end side can be reduced. Accordingly, even when the method is used for forming the air passage switching door where a length of one side seal member extending along the outer peripheral portion at one side of a rotation shaft is equal to or larger than 100 mm and a thickness of the seal member is equal to or smaller than 2.0 mm, a deformation of the seal member due to an inner shrinking force can be sufficiently restricted. As a result, a door sealing performance of the air passage switching door can be improved.

According to experiments by the inventors of the present invention, the method can be effectively used for forming the air passage switching door where the thickness of the seal member is equal to or smaller than 1.5 mm.

Preferably, in the injecting step, the flow length of the melted elastic material injected from each injection gate is set equal to or smaller than 30 mm. Therefore, a residual stress during a molding can be further reduced, and a corner deformation of the seal member can be further accurately restricted.

More preferably, the flow length of the melted elastic material injected from each injection gate is set to be in a range of 20–30 mm. Therefore, the air passage switching door can be manufactured in low cost, while the deformation of the seal member due to the inner shrinking force can be sufficiently restricted.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PREFERRED EMBODIMENT

Figure 1:
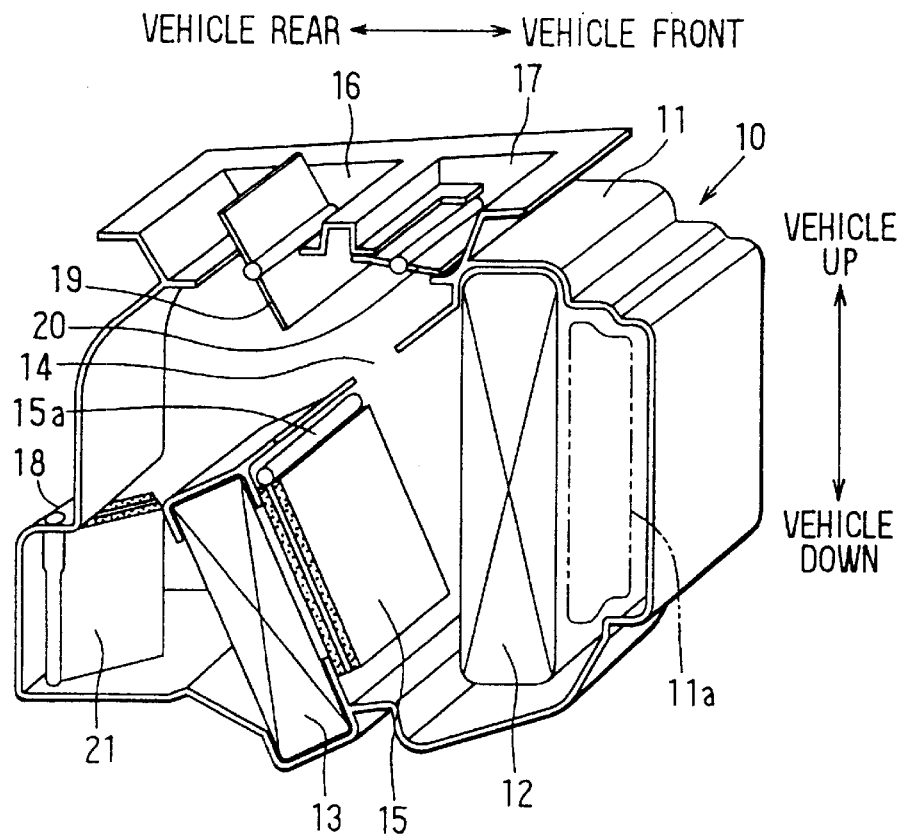
FIG. 1 is a schematic perspective view showing an air conditioner for a vehicle according to a preferred embodiment of the present invention.

A preferred embodiment of the present invention will be now described with reference to the accompanying drawings. An air conditioning unit 10 of a vehicle air conditioner is disposed in a passenger compartment at an approximately center portion of an instrument panel (not shown) in a vehicle width direction (i.e., right-left direction). The instrument panel is disposed in a front part of the passenger compartment of the vehicle. In the first embodiment, the air conditioning unit 10 is installed in the vehicle to correspond to an arrangement direction of FIG. 1. A blower unit (not shown) is disposed in the passenger compartment at a front passenger's seat side shifted from the air conditioning unit 10 in the vehicle width direction. As shown in FIG. 1, the air conditioning unit 10 has an air conditioning case 11 which defines an air passage for leading air toward the passenger compartment. An air inlet 11a through which air is introduced into the air conditioning case 11 is formed on a most front portion of the air conditioning case 11. An outlet of the blower unit is connected to an air inlet 11a of the air conditioning case 11, so that air blown by the blower unit flows into the air conditioning case 11 through the air inlet 11a. Air introduced into the air conditioning case 11 is cooled by an evaporator 12 of a refrigerant cycle, and then is heated by a heater core 13 which heats air using hot water (i.e., engine cooling water) as a heating source. An amount of air passing through the heater core 13 and an amount of air bypassing the heater core 13 are adjusted by a plate-like air mixing door 15 so that the temperature of air to be blown into the passenger compartment is adjusted to have a predetermined temperature.

The air mixing door 15 is rotated by a rotation shaft 15a in the air conditioning case 11. A ratio between an amount of air passing through the heater core 13 and an amount of air passing through a bypass passage 14 through which air bypasses the heater core 13 is adjusted by controlling a rotation position of the air mixing door 15. The conditioned air is blown into the passenger compartment through at least one of three opening portions formed in the air conditioning case 11. The three opening portions are a face opening 16 through which air is blown toward the head portion of a passenger in the passenger compartment, a defroster opening 17 through which air is blown toward an inner surface of a windshield of the vehicle, and a foot opening 18 through which air is blown toward the foot portion of the passenger.

The face opening 16, the defroster opening 17 and the foot opening 18 are opened and closed, respectively, by a face door 19, a defroster door 20, and a foot door 21. The face door 19 and the defroster door 20 are butterfly doors as shown in FIGS. 1, 2.

Figure 2:
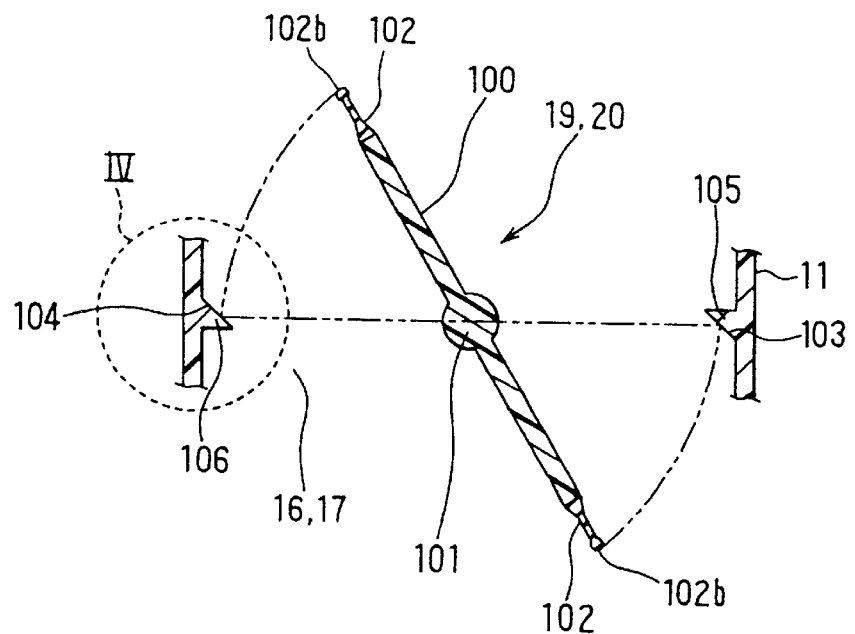
FIG. 2 is a schematic sectional view showing a butterfly door applied to the air conditioner in FIG. 1.
Figure 3:
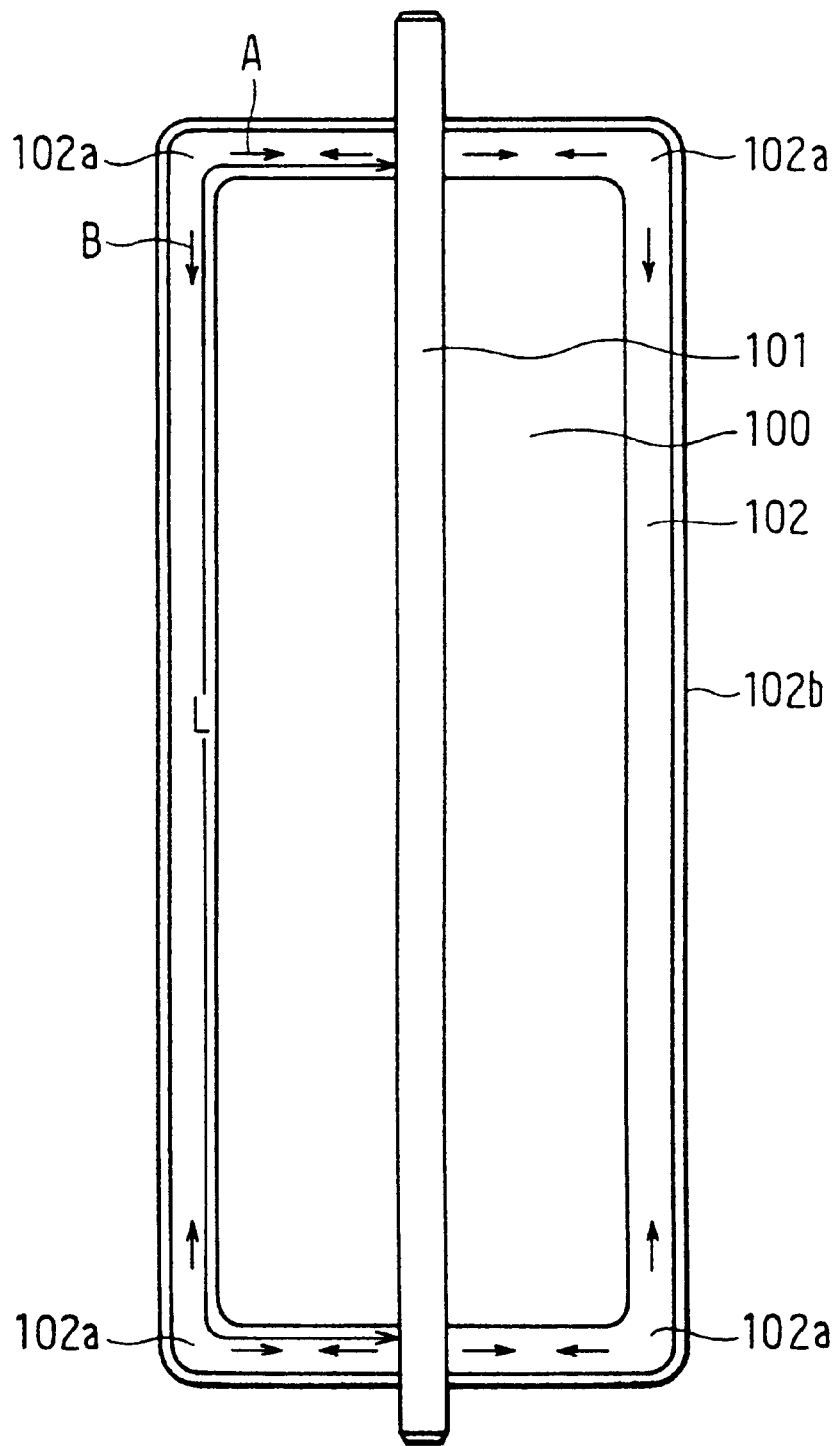
FIG. 3 is a top view showing the butterfly door according to the embodiment.

Referring to FIGS. 2, 3, each of the butterfly doors 19, 20 has a door body 100 formed into an approximate rectangular shape using an inelastic material having a high rigidity, such as resin. A rotation shaft 101 for rotating the door body 100 is integrally formed with the door body 100 to extend in a longitudinal direction of the door body 100, and is disposed at a center of the door body 100 in a lateral direction (i.e., minor-diameter direction) of the door body 100. Hereinafter, both side ends of each door 19, 20 in the lateral direction are referred to as lateral side ends, and both side ends of each door 19, 20 in the longitudinal direction are referred to as longitudinal side ends.

A seal member 102 made of an elastic material (elastomer) is attached to an outer peripheral portion of the door body 100 in such a manner that the door body 100 is framed by the seal member 102. The seal member 102 is a lip-like seal sheet extending continuously outside from the outer peripheral portion of the door body 100. The door body 100 and the seal member 102 can be integrally formed by a method described later.

The door body 100 of the door 19, 20 is made of a resin material such as polypropylene, nylon and ABS resin. A filler such as glass fiber may be mixed into the resin material of the door body 100 to enhance a strength of the door body 100. The seal member 102 is made of elastomer such as olefin elastomer of thermoplastic elastomer (TPE). The air conditioning case 11 may be made of the same resin material as that of the door body 100.

Referring to FIG. 2, the air conditioning case 11 has ribs 105, 106 protruding from the inner wall of the air conditioning case 11 at the positions forming the face and defroster openings 16, 17. The ribs 105, 106 respectively have an inclined seal surface 103, 104. Here, each of the face and defroster openings 16, 17 has a rectangular shape corresponding to each rectangular shape of the butterfly doors 19, 20. The rib 105 having the seal surface 103 and the rib 106 having the seal surface 104 are formed to be positioned on right-left sides of the rotation shaft 101, using the rotation shaft 101 of the butterfly door 19, 20 as a boundary.

FIG. 2 shows an opening state of the butterfly door 19, 20. When operation force is applied to the rotation shaft 101 in a rotation direction so that the butterfly door 19, 20 is rotated by a predetermined rotation angle in the counterclockwise direction of FIG. 2, an outer peripheral end portion 102b of the seal member 102 of the butterfly door 19, 20 press-contacts the seal surfaces 103, 104 of the ribs 105, 106 of each opening portion 16, 17. Therefore, the outer peripheral portion of the door body portion 100 can be sealed relative to the air conditioning case 11, and the opening portions 16, 17 of the air conditioning case 11 can be closed by the butterfly doors 19, 20. Here, the outer peripheral end portion 102b of the thin-plate like (i.e., flat sheet like) seal member 102 press-contacts the ribs 105, 106 of the air conditioning case 11 on both sides of a first end of the door body portion 100 parallel to the rotation shaft 101 and a second end thereof perpendicular to the rotation shaft 101. In the first embodiment of the present invention, a length of the first end of the door body portion 100 is larger than the second end of the door body portion 100. That is, the first end of the door body portion 100 corresponds to the longitudinal side ends of the door 19, 20, and the second end thereof corresponds to the lateral side ends of the door 19, 20.

Figure 4:
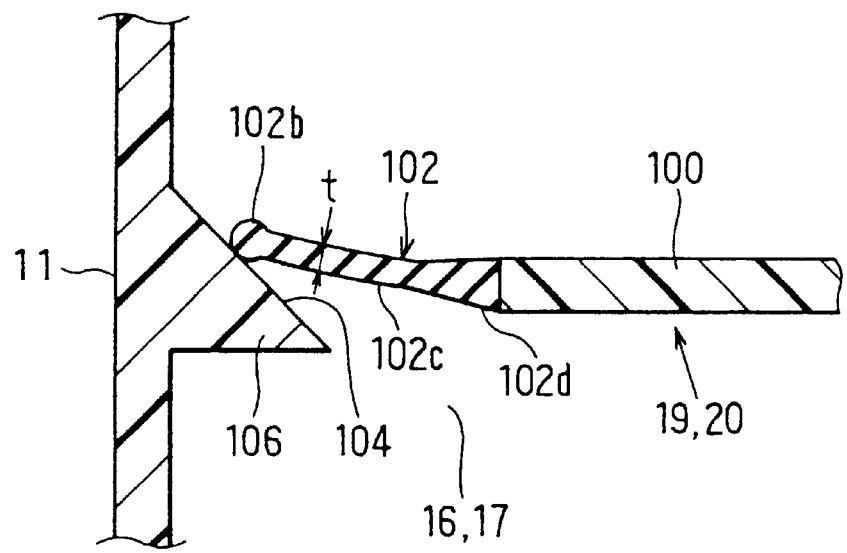
FIG. 4 is an enlarged view of a portion indicated by chain circle IV in FIG. 2 when the door contacts an air conditioning case according to the embodiment.

FIG. 4 shows a state in which the outer peripheral end portion 102b of the sheet-like seal member 102 is press-fitted to the inclined seal surface 104 of the rib 106. The seal surfaces 103, 104 are formed to be inclined, so that a contacting-surface pressure between the seal member 102 and the air conditioning case 11 is increased. Therefore, sealing-effect for air-tightly sealing the openings 16, 17 of the air conditioning case 11 can be improved.

Figure 5:
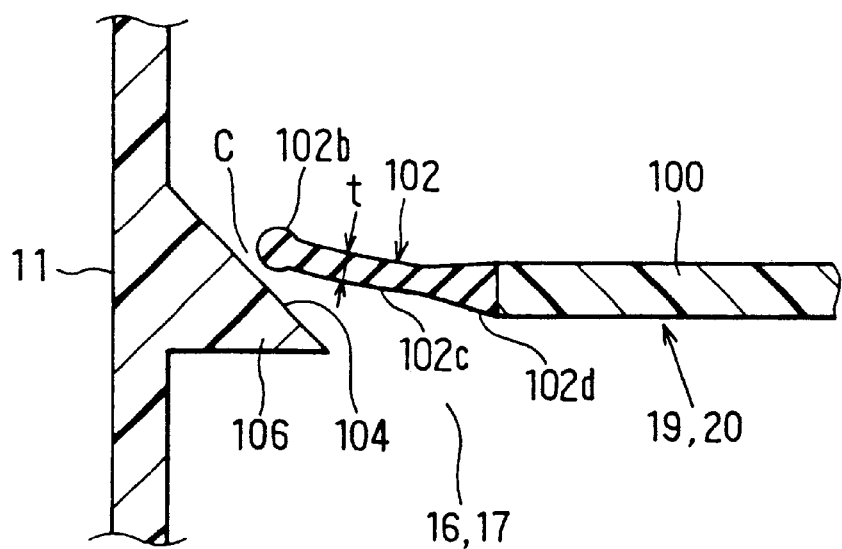
FIG. 5 is an enlarged view of a portion indicated by chain circle IV in FIG. 2 according to a comparison example.

A sectional shape of the seal member 102 will be described in detail. As shown in FIGS. 4 and 5, the seal member 102 includes the outer peripheral end portion 102b with an approximately circular sectional area, a thin plate-like straight portion 102c and a taper portion 102d. The straight portion 102c is elastically deformed when the seal member 102 press-contacts the ribs 105, 106. For reducing a door operation force, a thickness "t" of the straight portion 102c of the seal member 102 is set to be equal to or smaller than 2.0 mm. Preferably, the thickness "t" of the straight portion 102c of the seal member 102 is set to be equal to or smaller than 1.5 mm. More preferably, the thickness "t" of the straight portion 102c of the seal member 102 is set in a range of 1.0–1.2 mm. In this embodiment, a plate thickness of the seal member 102 generally means the plate thickness "t" of the elastically deformed straight portion 102c. For example, a width dimension (i.e., left-right dimension in FIGS. 4 and 5) of the straight portion 102c is about 6 mm.

The plate thickness of the taper portion 102d is formed to be gradually increased from the thickness "t" of the straight portion 102c until the plate thickness of the door body portion 100. The plate thickness of the door body portion 100 is in a range of 3.0–3.5 mm, for example.

Because the thickness of the seal member 102 is made to be equal to or smaller than 2.0 mm and a length L of the seal member 102 extending along the outer peripheral portion of the door body portion 100 at one side of the rotation shaft 101 is made equal to or larger than 100 mm, a shrinking force is readily generated as shown by arrow A, B in FIG. 3, while the seal member 102 is formed. Therefore, the seal member 102 at corner portions 102a is readily deformed to a side of the door body portion 100. As a result, a clearance C is provided between the outer peripheral end portion 102b and the seal surface 104, as shown in FIG. 5. However, in this embodiment, the deformation of the seal member can be effectively restricted by using the following method.

Figure 6:
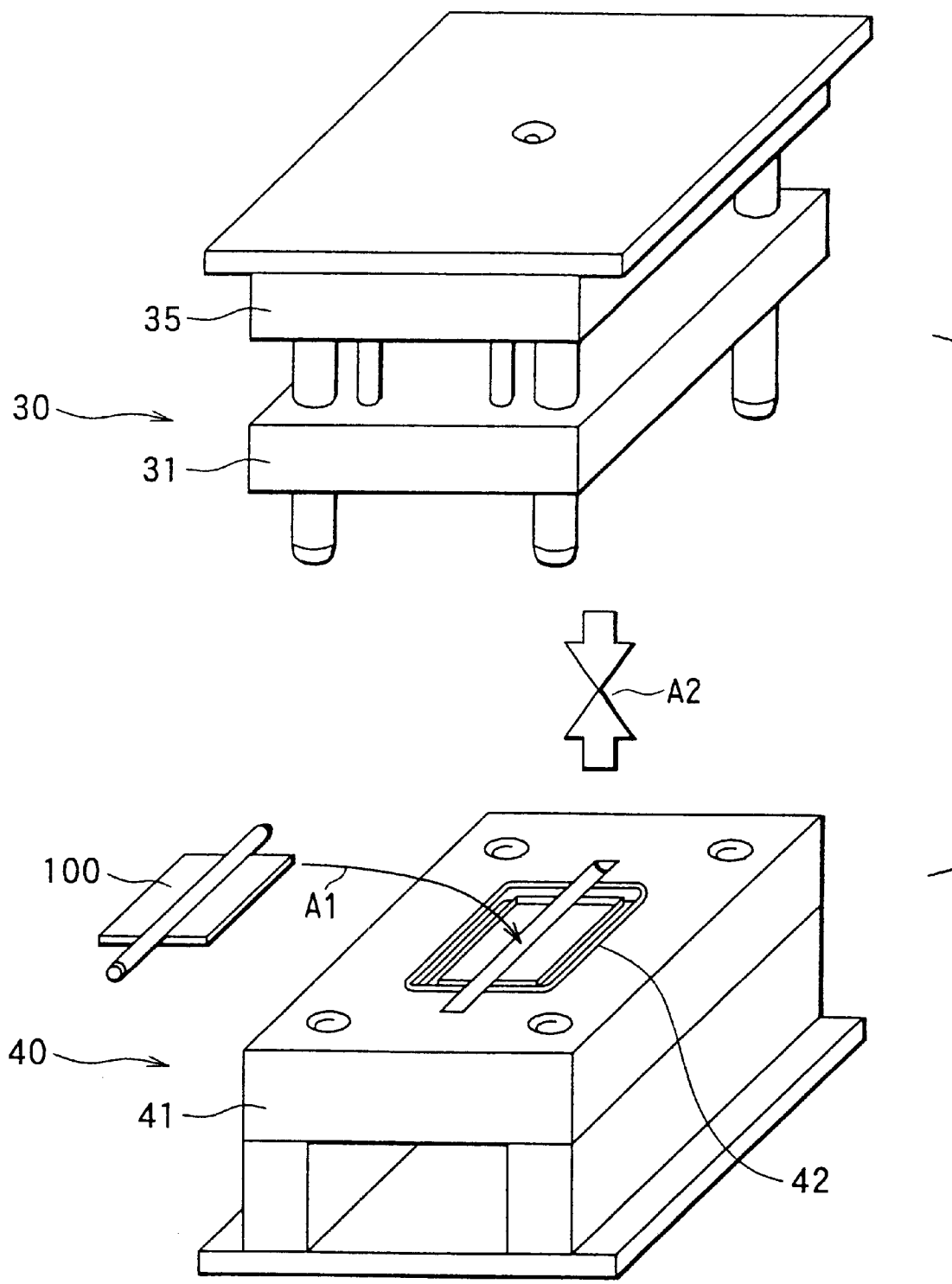
FIG. 6 is a disassembled perspective view showing a forming die used in the embodiment.

Next, the method for manufacturing the door 19, 20 will be now described. FIGS. 6–9C show a forming die and forming steps for forming the door 19, 20. As shown in FIG. 6, the forming die is a metal die constructed by an upper mold 30 and a lower mold 40. In this embodiment, the upper mold 30 is a movable mold, and the lower mold 40 is a stationary mold.

Figure 9A:
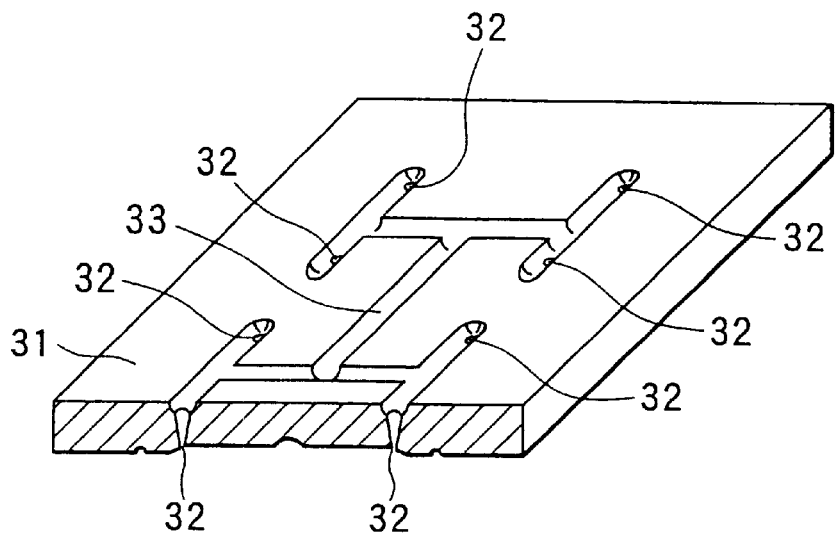
FIGS. 9A–9C are views for explaining a multi-point gate structure, according to the embodiment.
Figure 9B:
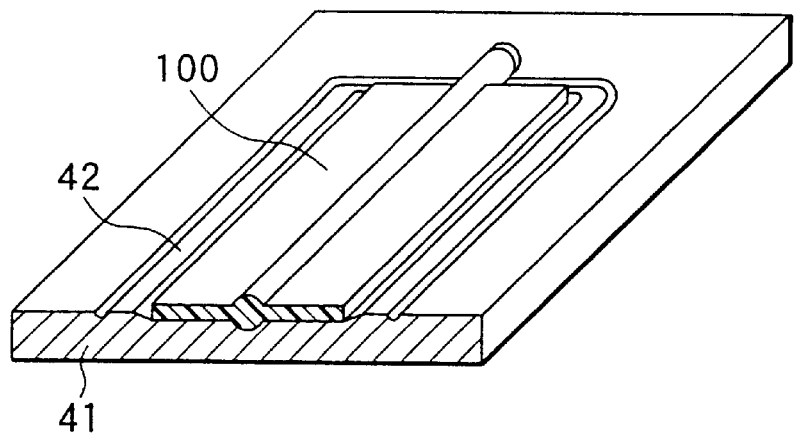
Figure 9C:
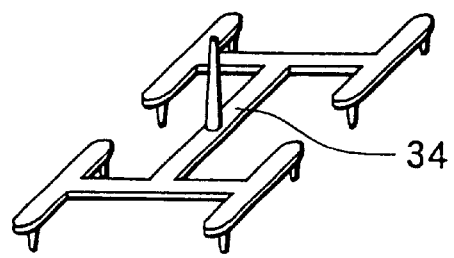

As shown in FIGS. 9A–9C, a mold space 42 for molding a seal member of a door is defined by a mold plate 31 of the upper mold 30 and a mold plate 41 of the lower mold 40. Further, in the mold plate 31 of the upper mold 30, plural injection gates 32 for injecting a melted elastic material into the mold space 42 are provided. In FIG. 9A, the injection gates 32 are set at eight points in the mold plate 31. A runner passage 33 is provided in the mold plate 31. Through the runner passage 33, the melted elastic material supplied from a nozzle (not shown) of a forming machine is supplied to the injection gates 32 while being branched. Each injection gate 32 is formed to have a throttled passage shape in which a passage sectional area of the runner passage portion 33 is throttled.

Figure 7:
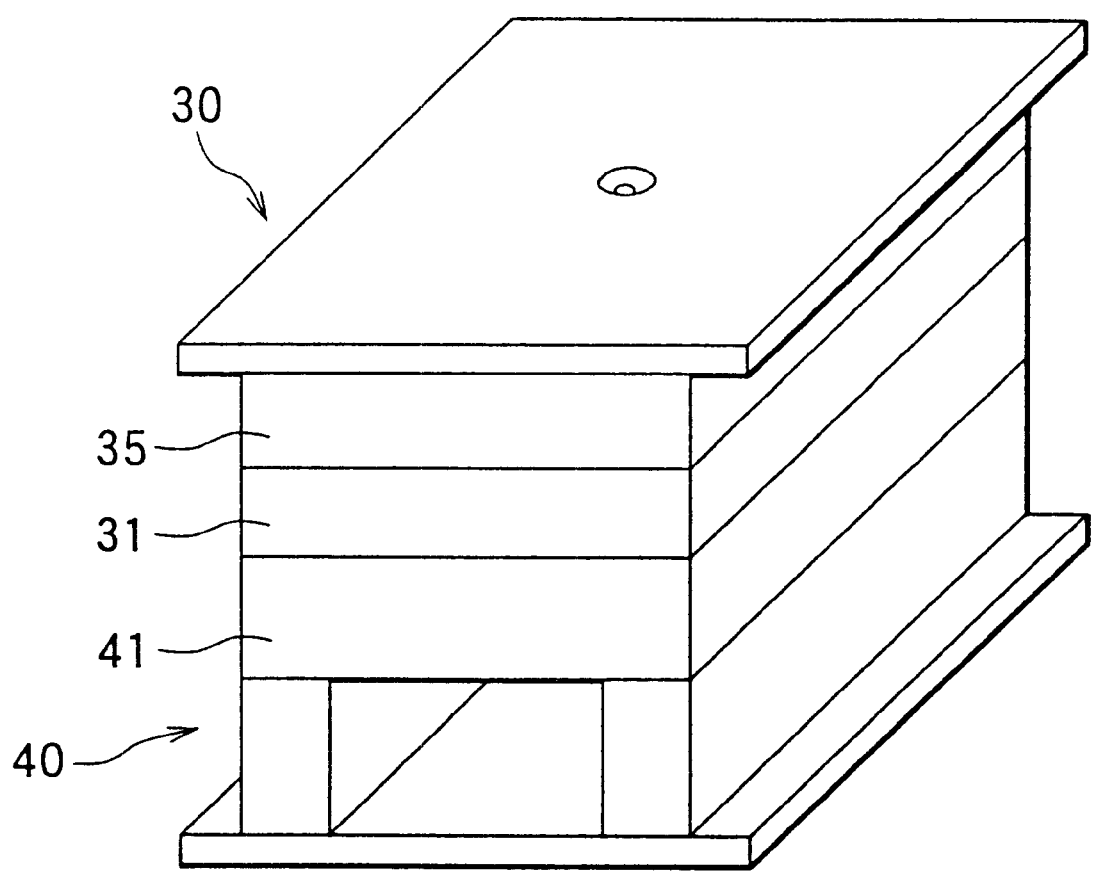
FIG. 7 is a schematic perspective view showing a fastening state of the forming die in a molding step, according to the embodiment.
Figure 8:
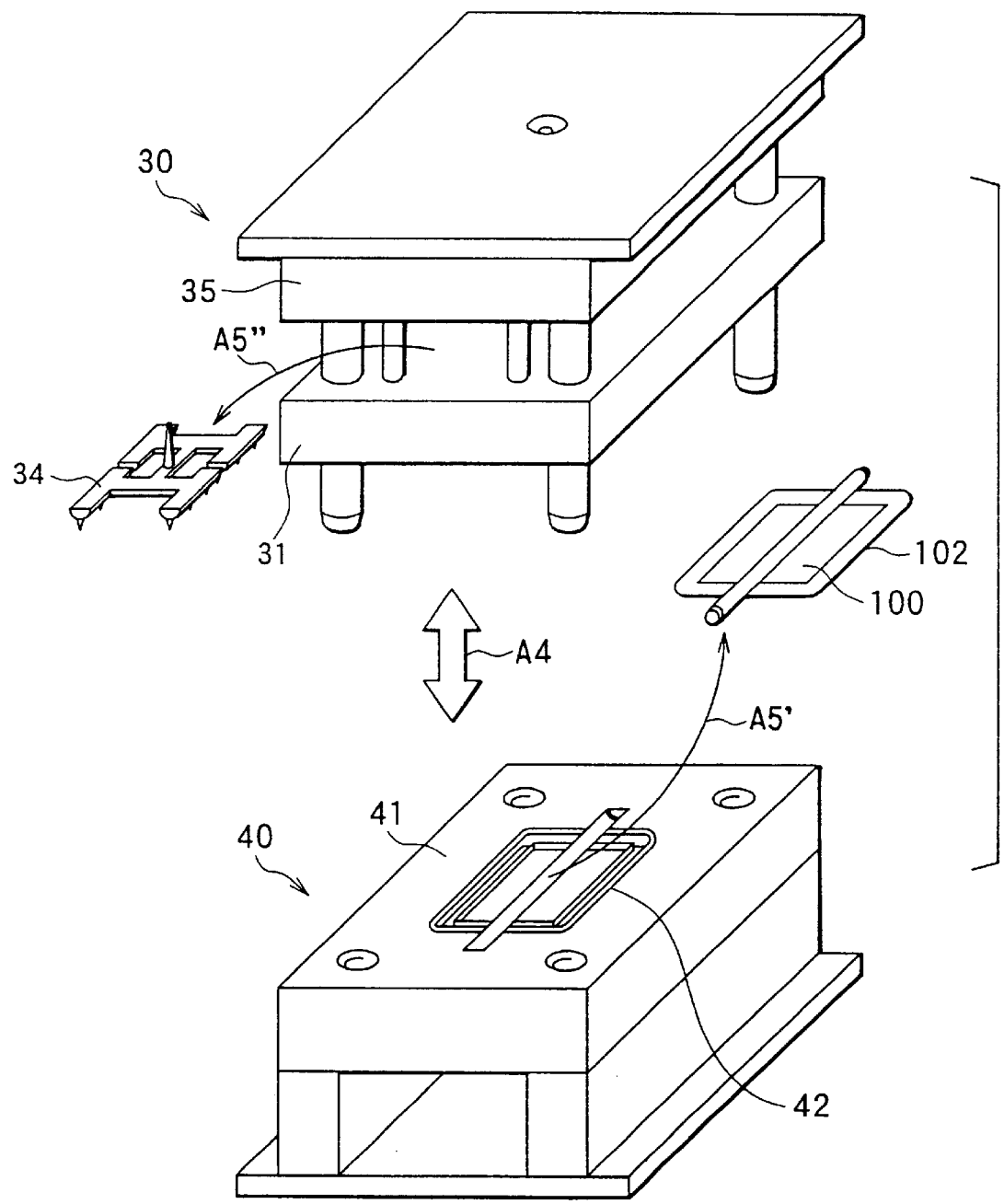
FIG. 8 is a disassembled perspective view showing an opened state of the forming die in a removing step after the molding step, according to the embodiment.

FIG. 9C shows a runner forming body 34 which is formed in the runner passage portion 33. As shown in FIG. 8, a runner stopper plate 35, for removing the runner forming body 34 to an outside from the upper mold 30, is provided in the upper mold 30. FIGS. 6 and 8 show the upper mold 30 and the lower mold 40 in a state where the runner stopper plate 35 is opened. On the other hand, FIG. 7 shows the upper mold 30 and the lower mold 40 in a state where the runner stopper plate 35 is closed. In this embodiment, the forming die is constructed by three-plate mold structure due to the upper and lower mold plates 31, 41 and the runner stopper plate 35.

Next, door forming steps according to this embodiment will be now described. For forming a butterfly door shown in FIG. 3, the door body 100 having the rotation shaft 101 is molded beforehand as a primary forming product. Thereafter, as shown by arrow A1 in FIG. 6, while the upper mold 30 and the lower mold 40 are opened, the door body 100 as the primary forming product is inserted into a predetermined position of the mold space 42 of the mold plate 41 of the lower mold 40, in an insertion step of the primary forming product.

Next, as shown by arrow A2 in FIG. 6, the upper mold 30 is fastened relative to the lower mold 40, in a mold fastening step. FIG. 7 shows the fastened state after the upper mold 30 is fastened relative to the lower mold 40. In this fastened state shown in FIG. 7, the melted elastic material is supplied to the runner passage portion 33 from the nozzle of the forming machine. The melted elastic material in the runner passage portion 33 is branched into the eight injection gates 32, and is injected into the mold space 42 from the injection gates 32 by a predetermined injection pressure. After the injection of the melted elastic material into the mold space 42, the injected elastic material is held in the mold space 42 under a predetermined holding pressure for a predetermined time. A time for which the pressure inside the mold space 42 is maintained at a predetermined pressure is referred to as "a holding time".

In this embodiment, in a period from the injection of the melted elastic material until the finishing of the pressure-holding, temperature of the forming die is adjusted to correspond to a flow performance of the melted elastic material. After the holding time passes, the forming die is cooled for a predetermined time. Through the above-described method, an integrally forming step, for integrally forming the seal material 102 with the outer peripheral portion of the door body 100, is finished.

Next, an opening operation, for opening the upper mold 30 relative to the lower mold 40 is performed as shown by arrow A4 in FIG. 8. Thereafter, a secondary forming product, in which the seal member 102 is integrated with the door body 100, is removed from the mold space 42 of the mold plate 41 of the lower mold 40 as shown by arrow A5' in FIG. 8. Further, at this time, relative to the mold plate 31 of the upper mold 30, the runner stopper plate 35 is opened and separated. Accordingly, the runner forming body 34 can be removed from the mold plate 31 and the runner stopper plate 35, as shown by arrow A5" in FIG. 8.

Figure 10A:
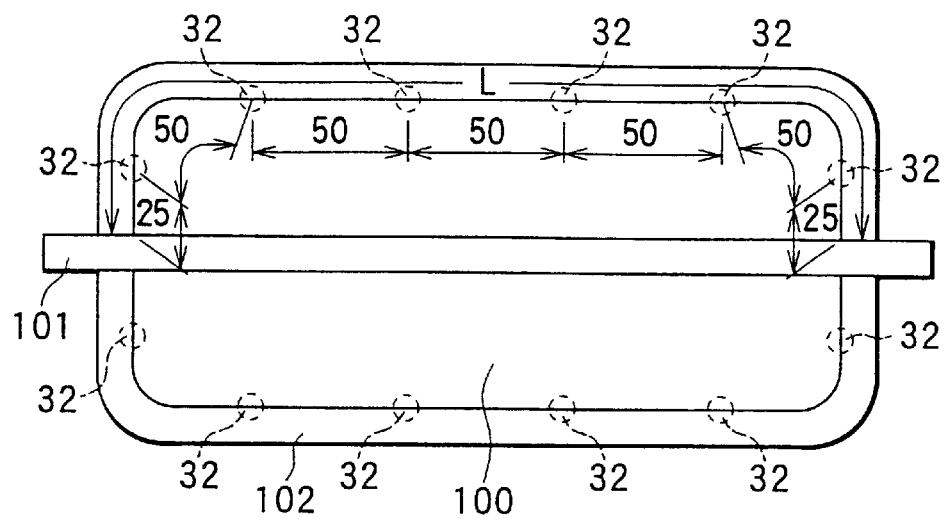
FIGS. 10A–10C are top view showing different arrangement examples of plural injection gates in the manufacturing method of this embodiment.

In the above-described door forming method, a flow length of the melted elastic material is determined by a set number of the injection gates 32. The seal member 102 can be divided into two parts relative to the rotation shaft 101. Here, one side length of the seal member 102 extending along the outer peripheral portion of the door body 100 at one side of the rotation shaft 101 is referred to as "one side seal length L". For example, as shown in FIG. 10A, when the one side seal length L is 300 mm, the injection gate 32 is provided at six positions for the one side seal length L of the seal member 102 at one side of the rotation shaft 101. In this case, the injection gates 32 are provided at twelve positions at regular intervals, for the whole length of the seal member 102. In this example shown in FIG. 10A, the flow length of the melted elastic material injected from each injection gate 32 is 25 mm. That is, the flow length of the melted elastic material injected from the injection gate 32 is half of the arrangement interval (50 mm) between adjacent two of the injection gates 32.

Figure 10B:
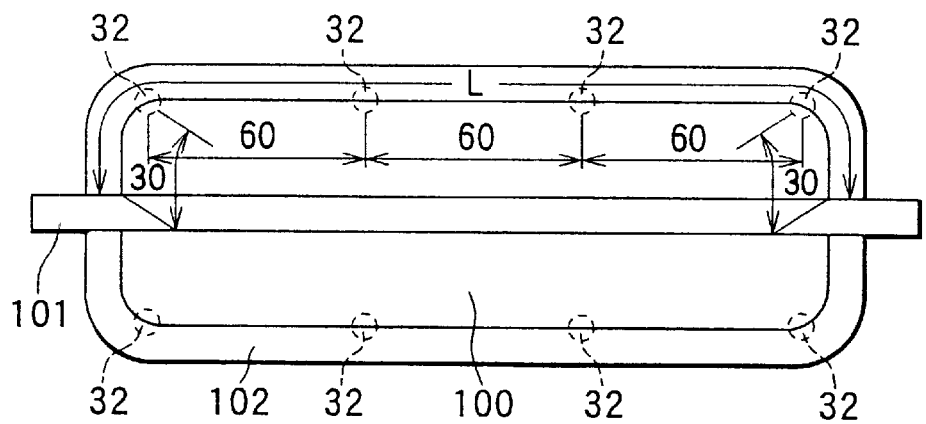

In the example of FIG. 10B, the one side seal length L is 240 mm. In this case, the injection gate 32 is provided at four position at regular intervals, for the one side seal length L of the seal member 102. Therefore, in FIG. 10B, the arrangement interval between adjacent two of the injection gates 32 is 60 mm, and the flow length of the melted elastic material injected from each injection gate 32 is 30 mm.

Figure 10C:
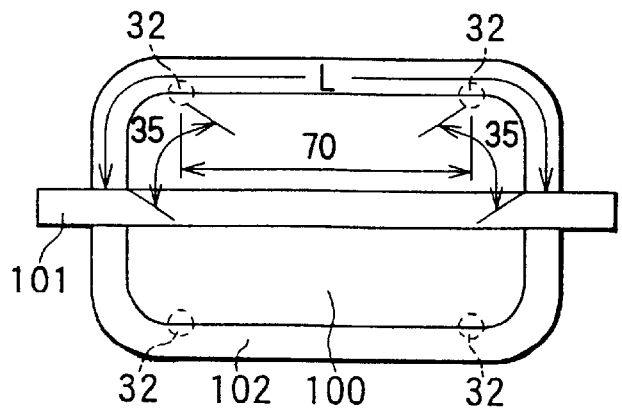

In the example of FIG. 10C, the one side seal length L of the seal member 102 is 140 mm. In this case, the injection gates 32 are provided at two positions with regular intervals, for the one side seal length L of the seal member 102. Therefore, In FIG. 100, the arrangement interval between adjacent two of the injection gates 32 is 70 mm, and the flow length of the melted elastic material injected from each injection gate 32 is 35 mm.

In this embodiment, as shown in FIGS. 10A–10C, the plural injection gates 32 are provided at regular intervals so that the flow length of melted elastic material injected from the injection gates 32 becomes uniform. In this embodiment, generally, the flow length of the melted elastic material is set to be equal to or smaller than 40 mm.

Figure 11A:
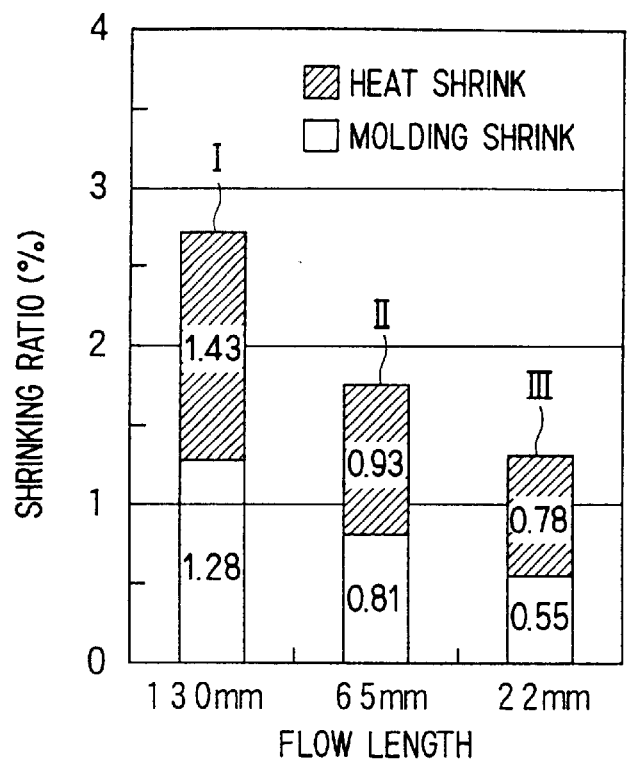
FIG. 11A is a graph showing experimental results regarding a shrinking ratio of a seal member, including a heat shrinking ratio and a molding shrinking ratio.
Figure 11B:
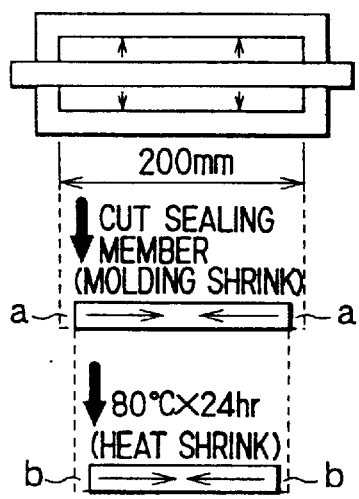
FIG. 11B is a view for explaining a heat shrink and a molding shrink, according to the embodiment.

FIG. 11A shows an experimental result by the inventors of the present invention, regarding a shrinking ratio of a seal member. The seal member 102 is shrunken by a molding shrink due to a residual stress and by a heat shrink due to elastic performance. As shown in FIG. 11B, when a predetermined length (e.g., 200 mm in FIG. 11B) is cut from the integrated seal member 102 integrated with the door body 100 of the secondary forming product, the length of the cut seal member 102 is shrunken by a molding shrinking dimension "a" due to a molding residual stress. Thereafter, the seal member 102 is placed under 80° C. for 24 hours, the length of the seal member 102 is further heat-shrunken by a heat shrinking dimension "b". In FIG. 11A, the vertical axis indicates each shrinking ratio of the molding shrinking dimension "a" and the heat shrinking dimension "b" to the original length (200 mm) of the seal member 102, when the flow length of the melted elastic material is set at different lengths.

In FIGS. 11A, 11B, the one side seal length L is set at 260 mm, the thickness t of the seal member 102 is set at 1 mm. In the comparison example I in FIG. 11A, only one gate 32 is provided for the one side seal length L of the seal member 102, and the flow length of the melted elastic material injected from each injection gate 32 is 130 mm. In the comparison example II in FIG. 11A, two gates 32 are provided for the one side seal length L of the seal member 102, and the flow length of the melted elastic material injected from each injection gate 32 is 65 mm. However, in the present example III in FIG. 11A of this embodiment, six gates 32 are provided for the one side seal length L of the seal member 102, and the flow length of the melted elastic material injected from each injection gate 32 is 22 mm.

Accordingly, in the present example III, it can prevent a cooling speed difference (temperature difference) or a pressure difference of the melted elastic material, between a position proximate to the injection gate 32 and a flow top end position (i.e., a center position between adjacent gates 32), from being increased. As a result, in the present example III, the shrinking ratio including both the molding shrinking ratio and the heat shrinking ratio can be greatly decreased to 1.3%, as compared with 2.71% of the comparison example I and 1.76% of the comparison example II.

Figure 12:
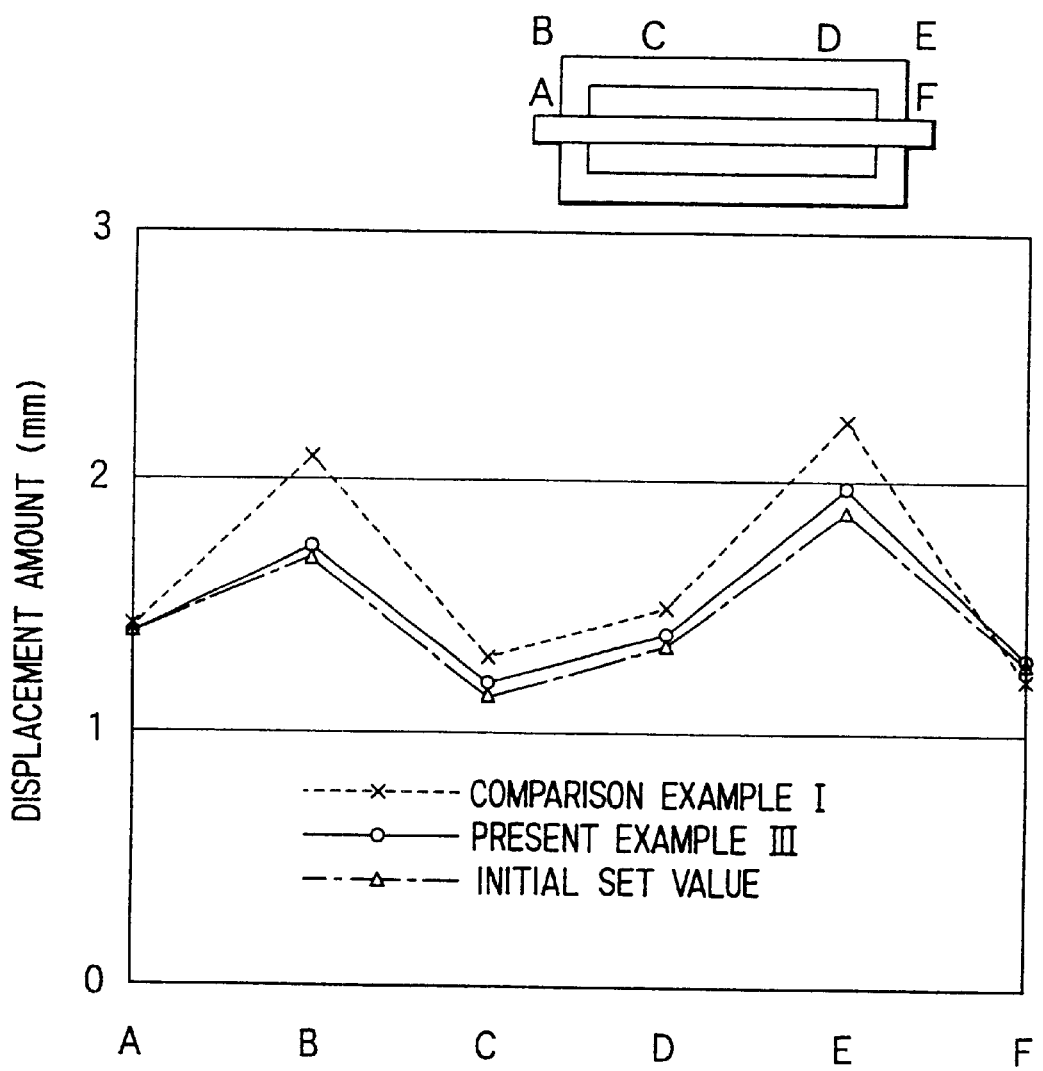
FIG. 12 is a graph showing experimental results regarding a displacement amount of the seal member at different positions, according to the embodiment.

FIG. 12 shows a displacement amount (upwardly bending amount) of the seal member 102 at different positions A, B, C, D, E and F. The displacement amount of the vertical axis in FIG. 12 is a displacement amount of the seal member 102 from a center in a door thickness direction, at the six different positions A–F. In a door free state immediately after the molding of the secondary forming product, because the seal member 102 is positioned at a center position in the door thickness direction by the strength of the door body 100, the displacement amount of the seal member 102 at the different positions A–F is zero.

In FIG. 12, the initial set valve (initial set displacement amount) is a displacement amount of the seal member 102 at the different positions A–F, when the outer peripheral end portion 102b of the seal member 102 press-contacts the seal surface 104 so that the seal member 102 is elastically deformed as shown in FIG. 4. Further, in FIG. 12, the comparison example I and the present example III are placed from the initial set position under 80° C. for 24 hours, and the displacement amounts of the comparison example I and the present example III at different positions A–F are measured.

As shown in FIG. 12, in the comparison example I where the flow length is 130 mm, the displacement amount at the corner B, E is increased from the initial set position by a degree of 0.3–0.4 mm. However, in the present example III where the flow length is 22 mm, the displacement amount at the corner B, E from the initial set position can be restricted to be approximately equal to or smaller than 0.1 mm.

Figure 13:
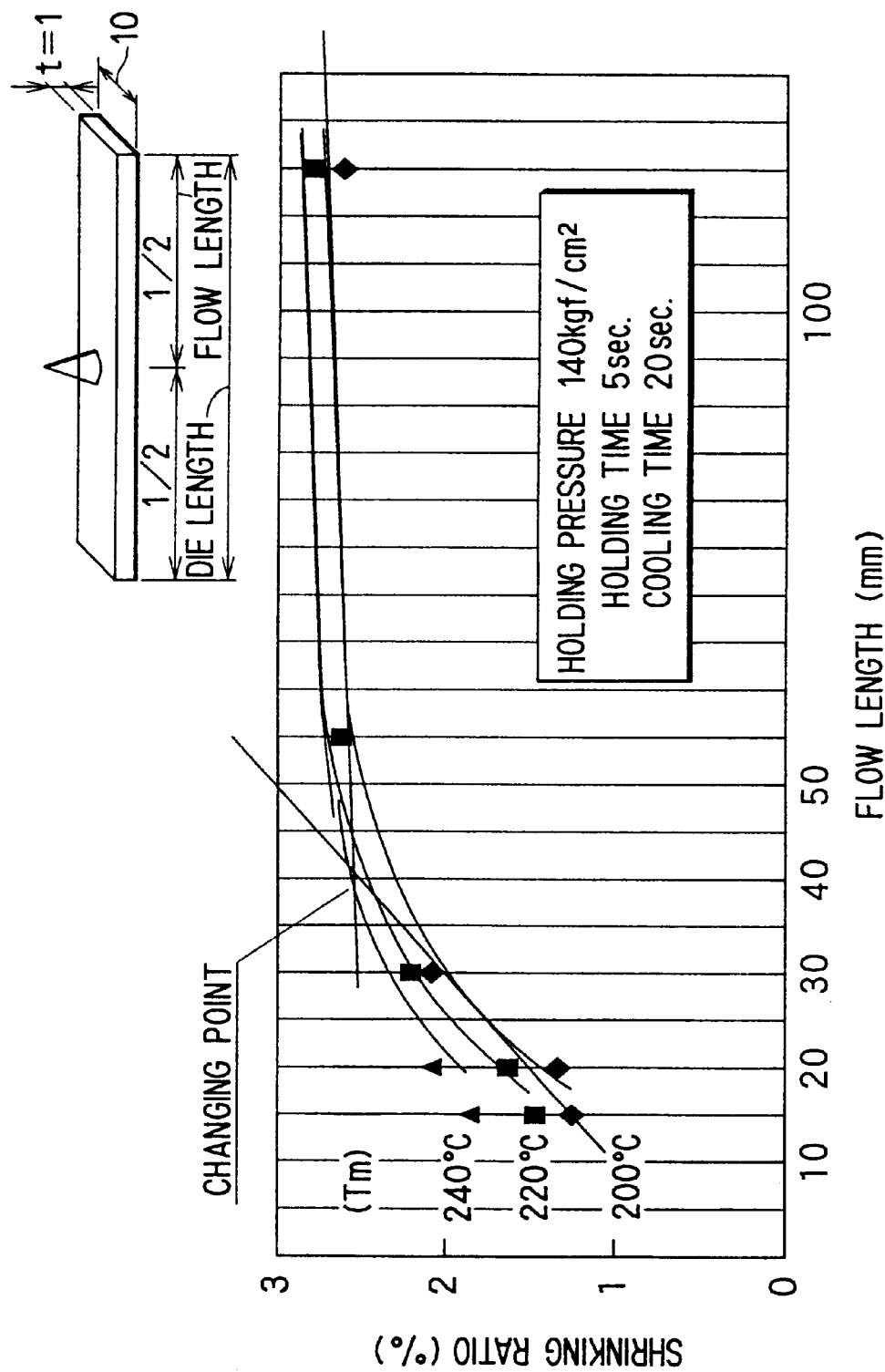
FIG. 13 is a graph showing experimental results regarding the shrinking ratio of the seal member, according to the embodiment.

FIG. 13 shows a relationship between the shrinking ratio composed of both the molding shrink and the heat shrink, and the flow length of the melted elastic material from each injection gate 32. In FIG. 13, the molding shrink is percentage of a dimension difference between the mold dimension and a dimension of the forming product, and the heat shrink is defined similar to that of FIG. 11.

Figure 14:
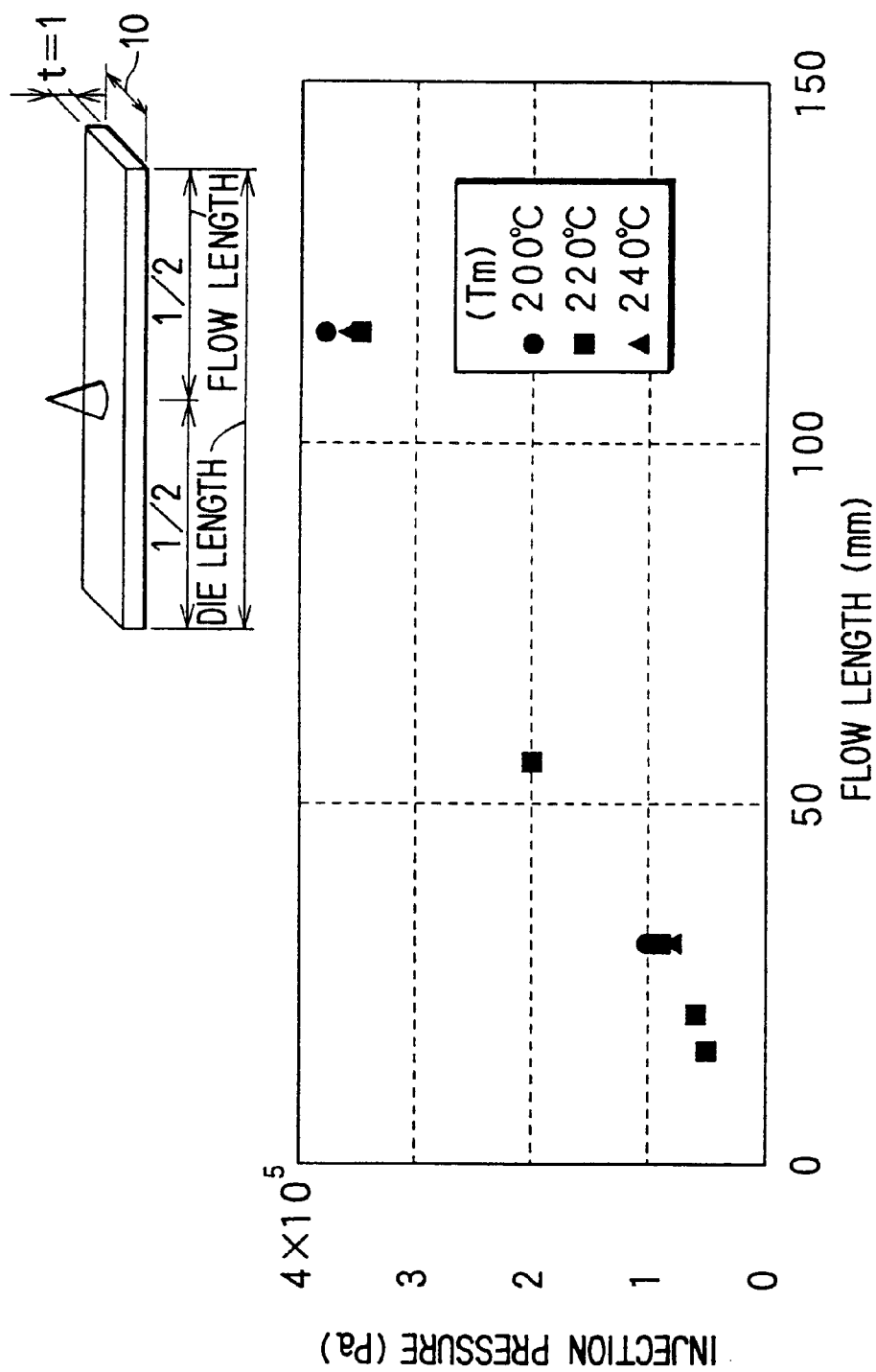
FIG. 14 is a graph showing an injection pressure corresponding to the experiment in FIG. 13.

In experimental conditions of FIG. 13, an olefin elastomer (melting point: 160° C.) is used as an elastic material for forming the seal member 102, and temperature (Tm) of the melted elastic material injected from each injection gate 32 is changed to 200° C., 220° C., 240° C. Further, in FIG. 13, the molding step shown in FIG. 7 is performed in a condition where the holding pressure is set at 140 Kgf/cm$^2$, the holding time for keeping the holding pressure is set at 5 seconds, and the cooling time is set at 20 seconds. The injection pressure is increased as the flow length of the melted elastic material increases, and can be slightly adjusted in accordance with the temperature of the melted elastic material, as shown in FIG. 14. Plotting points indicated in FIGS. 13 and 14 are the same experimental points.

As shown in FIG. 13, when the flow length of the melted elastic material is set to be equal to or smaller than 40 mm, the shrinking ratio is decreased regardless a change of the temperature (Tm) of the melted elastic material. Further, when the flow length is set to be equal to or smaller than 30 mm, the shrinking ratio can be further effectively reduced.

As the flow length of the melted elastic material injected from each injection gate 32 becomes smaller, the shrinking ratio is decreased. However, when the flow length of the melted elastic material is made smaller, it is necessary to increase the arrangement numbers of the injection gates 32. Accordingly, it is difficult to provide an arrangement space of a temperature adjustment heater or the like in the mold. Therefore, actually, the flow length is set to be equal to or larger than 20 mm. When the flow length of the melted elastic material is set to be in a range of 20–30 mm, the shrinking ratio can be further restricted while manufacturing cost of the air passage switching door is reduced.

Although the present invention has been fully described in connection with the preferred embodiment thereof with reference to the accompanying drawings, it is to be noted that various changes and modifications will become apparent to those skilled in the art.

For example, in the above-described embodiment, the present invention is typically applied to the door 19, 20 for switching an air outlet mode. However, the present invention may be applied to an air mixing door for adjusting temperature of air blown into the passenger compartment. Further, the door forming method of the present invention is not limited to the air passage switching door for a vehicle air conditioner, but may be applied to an air passage switching door of various use.

Further, in the above-described embodiment, the present invention is applied to the butterfly doors 19, 20 where the rotation shaft 101 is disposed at a center position of the door body 100. However, as shown in FIG. 1, the present invention can be applied to the doors 15, 21 where the rotation shaft is disposed at an end position. That is, the present invention can be applied to a door where a lip-like seal member is attached to an outer peripheral portion of a door body.

Such changes and modifications are to be understood as being within the scope of the present invention as defined by the appended claims.

What is claimed is:

1. A method for manufacturing an air passage switching door, the air passage switching door including a door body made of a material having a rigidity higher than a predetermined value, a seal member made of an elastic material having a heat shrinkage, and a rotation shaft provided integrally with the door body for rotating the door body, wherein: the seal member continuously extending from the outer peripheral portion of the door body toward an outer side to have a thin plate shape; a length of the seal member extending along the outer peripheral portion at one side of the rotation shaft is equal to or larger than 100 mm; and a thickness of the seal member is equal to or smaller than 2.0 mm, the method comprising:

an injecting step for injecting a melted elastic material from plural injection gates provided at plural positions into a mold space within a forming die for forming the seal member of the door, wherein, in the injecting step, a flow length of the melted elastic material from each injection gate is equal to or small than 40 mm.

2. The method according to claim 1, wherein the thickness of the seal member is equal to or smaller than 1.5 mm.

3. The method according to claim 1, wherein, in the injecting step, the flow length of the melted elastic material injected from each injection gate is set equal to or smaller than 30 mm.

4. The method according to claim 3, wherein, in the injecting step, the flow length of the melted elastic material injected from each injection gate is set to be in a range of 20–30 mm.

5. The method according to claim 1, wherein, in the injecting step, the flow lengths of the melted elastic material injected from the injection gate are approximately uniform.

6. The method according to claim 1, wherein:

the forming die includes an upper mold with a mold plate where the plural injection gates are provided at predetermined positions, and a lower mold with a mold plate where the mold space is provided; and in the injecting step, the melted elastic material is supplied to the mold space of the lower mold from the injection gates provided in the mold plate of the upper mold.

7. The method according to claim 1, further comprising:

a holding step in which the melted elastic material after being injected into the mold space from the plural injection gates is held in the mold space under a predetermined pressure for a predetermined holding time.

8. A method for manufacturing an air passage switching door, the air passage switching door including a door body, a seal member continuously extending from an outer peripheral portion of the door body toward an outer side to have a thin plate shape, and a rotation shaft provided integrally with the door body for rotating the door body, the method comprising:

a primary forming step for forming the door body using a material having a rigidity higher than a predetermined value, and a seal member forming step for forming the seal member using an elastic material having a heat shrinkage, wherein:

the seal member forming step includes an injecting step for injecting a melted elastic material from plural injection gates provided at plural positions of a forming die into a mold space within the forming die for forming the seal member of the door; and in the injecting step, a flow length of the melted elastic material is set to be equal to or smaller than 40 mm.

9. The method according to claim 8, wherein:

a length of the seal member extending along the outer peripheral portion of the door body at one side of the rotation shaft is equal to or larger than 100 mm, and a thickness of the seal member is equal to or smaller than 2.0 mm.

10. The method according to claim 9, wherein the thickness of the seal member is equal to or smaller than 1.5 mm.

11. The method according to claim 8, wherein, in the injecting step, the flow length of the melted elastic material injecting from each injection gate is set equal to or smaller than 30 mm.

12. The method according to claim 8, wherein, in the injecting step, the flow length of the melted elastic material injected from each injection gate is set to be in a range of 20–30 mm.

13. The method to claim 8, wherein, in the injecting step, the flow lengths of the melted elastic material injected from the injection gates are approximately uniform.

14. The method according to claim 1, wherein at least four injection gates are provided at different positions along a periphery of the seal member.

15. The method according to claim 8, wherein at least four injection gates are provided at different positions along a periphery of the seal member.

* * * * *